United States Patent
McClure et al.

(10) Patent No.: US 6,857,251 B2
(45) Date of Patent: Feb. 22, 2005

(54) PIVOTING SIDE TWINE BOX FOR ROUND BALERS

(75) Inventors: John R. McClure, New Holland, PA (US); Fred M. Horchler, Jr., Lancaster, PA (US); Ronald L. McAllister, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/165,586

(22) Filed: Jun. 8, 2002

(65) Prior Publication Data

US 2003/0226334 A1 Dec. 11, 2003

(51) Int. Cl.[7] .............................................. B65B 13/00
(52) U.S. Cl. ................................... 53/587; 100/912
(58) Field of Search ........................... 53/587–589, 176, 53/389.2; 56/132–133, 16.4 B; 100/5, 88, 912

(56) References Cited

U.S. PATENT DOCUMENTS

| | | | | |
|---|---|---|---|---|
| 2,879,709 A | * | 3/1959 | Nelson et al. .................. | 100/4 |
| 2,989,172 A | * | 6/1961 | Stoll .......................... | 206/409 |
| 3,965,653 A | * | 6/1976 | Lerner ........................ | 53/570 |
| 4,205,513 A | | 6/1980 | Shokoples ................... | 56/341 |
| 4,604,848 A | * | 8/1986 | Clostermeyer ............... | 53/118 |
| 4,610,123 A | * | 9/1986 | Krone et al. ................. | 53/118 |
| 4,612,855 A | | 9/1986 | Wagstaff et al. .............. | 100/5 |
| 4,841,851 A | * | 6/1989 | Quataert ...................... | 100/5 |
| 4,890,443 A | * | 1/1990 | Diehm ........................ | 53/118 |
| 4,956,968 A | * | 9/1990 | Underhill .................... | 56/341 |
| 5,230,282 A | * | 7/1993 | Barnes ........................ | 100/34 |
| 5,289,672 A | * | 3/1994 | Underhill .................... | 53/587 |
| 5,349,806 A | * | 9/1994 | Swearingen et al. .......... | 56/341 |
| 5,996,307 A | | 12/1999 | Niemerg et al. .............. | 53/118 |
| 6,247,291 B1 | | 6/2001 | Underhill .................... | 53/118 |

* cited by examiner

Primary Examiner—Rinaldi I. Rada
Assistant Examiner—John Paradiso
(74) Attorney, Agent, or Firm—John William Stader; Collin A. Webb

(57) ABSTRACT

A round baler having storage and dispensing mechanisms for both twine and net/plastic wrapping materials for the bales is disclosed. An improved twine box is pivotably attached to the sidewall of the baler, adjacent the front end of the baler and twine dispensing mechanism. The twine box, of sufficient size to hold multiple balls of twine, pivots forwardly between a pivoted, or inoperative, position and a closed, or operative position. In the pivoted position various functional components of the baler are accessible for maintenance, adjustment, or repair. The twine box is lockable in the closed position. Side panels on the baler are movable to cover, or uncover, the outside of the sidewall and twine box.

8 Claims, 4 Drawing Sheets

PIVOTING SIDE TWINE BOX FOR ROUND BALERS

BACKGROUND OF THE INVENTION

In general terms, the instant invention relates to agricultural baling machines for forming generally discrete cylindrical bales of crop material, commonly referred to as round bales, and more particularly to an improved twine box for holding, storing and dispensing twine that is used for wrapping the cylindrical bale to maintain its shape and structural integrity after it is formed in the bale-forming chamber and deposited on the ground.

Round balers have become quite popular throughout the world over the last twenty-five years, to the extent that they have, except for very specific-use situations and operations, all but replaced the previously universally accepted rectangular baler. Farmers have found that the advantages of a larger bale, improved storage and weathering characteristics, and reduced labor costs outweigh the increased equipment costs.

Round balers generally have a bale-forming chamber defined by a pair of opposing side walls associated with an array of side-by-side belts, transverse slats trained on chains, a plurality of transverse rolls or a combination of these various elements. During field operation, windrowed crop material such as hay is picked up from the ground and fed in a continuous stream into a fixed or variable diameter chamber. The hay is rolled into a cylindrical package within the chamber, wrapped with twine, net or plastic wrap and ejected onto the ground for subsequent handling.

U.S. Pat. No. 5,289,672, issued on Mar. 4, 1994, in the name of Kenneth R. Underhill, and U.S. Pat. No. 4,956,968, issued on Sep. 18, 1990, also in the name of Kenneth R. Underhill, disclose one type of prior art round baler of the general nature described above. In this particular type of baler, a pair of fixed sidewalls defines an expandable chamber, and a plurality of side-by-side belts cooperating with a series of transverse rolls mounted between a pair of pivotally mounted arms. This arrangement of rolls and arms is commonly referred to as a sledge assembly. The chamber includes an inlet opening in the front through which crop material is fed. Also included is a pair of take-up arms pivotally mounted on the main frame, between which arms a pair of guide rolls is journaled. A biasing force on the take-up arms urges the outer surfaces of the guide rolls against the belts to maintain tension and thereby prevent slack from occurring in the belts during expansion and contraction of the chamber. Varying the force on the take-up arms regulates the density of the bale.

Another type of prior art round baler of the same general nature as that described immediately above employs a plurality of transverse rolls to define a cylindrical bale-forming chamber having a fixed diameter. Examples of this type baler are shown in U.S. Pat. No. 4,612,855, issued on Sep. 23, 2986, in the name of Robert A. Wagstaff et at., U.S. Pat. No. 4,604,848, issued Aug. 12, 1986, in the name of Gerhard Clostermeyer, and U.S. Pat. No. 4,841,851, issued on Jun. 2, 1989, in the name of Pierre Quataert. It should be noted that the '851 patent shows additional embodiments wherein a fixed diameter chamber is defined by means other than rolls. U.S. Pat. No. 5,349,806, issued on Sep. 27, 1994, in the name of John R. Swearingen et al. and U.S. Pat. No. 4,610,123, issued Sep. 9, 1986, in the name of Bernard Krone et al. are additional examples of prior art round balers having fixed diameter chambers defined by transverse slats.

The instant invention relates to apparatus for storing twine used in a wrapping system for a round baler. The type of round baler to which the instant invention is adaptable is basically unlimited, because, as will be discussed further below, the twine box of the instant invention can prove advantageous in several ways over similar devices heretofore known and used in substantially all types of round balers.

As stated above, it is not uncommon in prior art round balers to dispense the twine from a storage container carried on the baler main frame, as shown, for example, in the '968 patent referred to above. The novel and unique characteristics of the instant invention, described in detail below, contribute to a wrapping system for round balers that conveniently stores twine in a location consistent with the appropriate introduction of twine to the periphery of the cylindrical package of crop material formed in the bale-forming chamber, regardless of whether the diameter of the chamber is fixed or variable, and regardless of the nature of the transverse wall, i.e., whether belts, rolls, slats, or a combination thereof.

U.S. Pat. No. 6,247,291, issued on Jun. 19, 2001, in the name of Kenneth R. Underhill, discloses a storage apparatus for round balers wrapping material. The term "wrapping material" encompasses not only twine, but also, rolls of wrapping material, such as net and plastic wrap. In order to be able to alternatively dispense these two types of wrapping material, the storage means, or container, is pivotably mounted to the main frame, across the front of the bale-forming chamber. This patent (U.S. Pat. No. 6,247,291) is hereby incorporated herein in its entirety by reference, as well as any documents incorporated therein by reference.

A family of presently commercially available machines, exemplified by the New Holland Model 688 Round Baler, employs a storage apparatus similar in some respects to that shown in the '291 patent; however, the storage compartment includes space only for net/plastic wrap and two balls of twine, one at each end of the net/plastic wrap roll. In order to employ more than two bales of twine, an important efficiency characteristic, the operator must remove much of the net/plastic wrap mechanism to make room for additional twine bales.

Some difficulties and shortcomings have been identified in the structure of the '291 storage means, including the inconvenience of having too little storage space, under practical conditions, for twine to maximize efficiency of the baler in field operation. Also, the process has been found to be inconvenient and excessively time consuming to switch between twine and net/plastic wrap operations. Further, the commercially available machines, such as that mentioned above, are also more difficult to change over to efficient twine operation. The unique features proffered by the structure of the instant invention overcome the shortcomings identified and contribute to improved performance and operability of round balers. Additionally, these features are consistent with simplification and enhancement of routine serviceability as well as field maintenance, all of which lead to a baler that is significantly more operator friendly than prior art balers.

SUMMARY OF THE INVENTION

Accordingly, it is an object of the instant invention to provide a round baler with a pivotable twine box that improves access to the baler functional components.

It is another object of the instant invention to provide a pivotable twine box that provides convenient access to the twine stored therein.

It is a further object of the instant invention to provide a round baler having a twine box that is pivotable to an inoperative position that permits the simultaneous storage and alternative use of net/plastic wrap.

It is a still further object of the instant invention to provide a twine box that is pivotable between inoperative and operative positions that does not require readjustment of the twine tension and set up of the wrapping mechanism.

These and other objects are obtained by providing a round baler having storage and dispensing mechanisms for both twine and net/plastic wrapping materials for the bales. An improved twine box is pivotably attached to the sidewall of the baler, adjacent the front end of the baler and twine dispensing mechanism. The twine box, of sufficient size to hold multiple balls of twine, pivots forwardly between a pivoted, or inoperative, position and a closed, or operative position. In the pivoted position various functional components of the baler are accessible for maintenance, adjustment, or repair. The twine box is lockable in the closed position. Side panels on the baler are movable to cover, or uncover, the outside of the sidewall and twine box.

DETAILED DESCRIPTION OF THE PREFERRED EMBODIMENT

The terms "left" and "right", "up" or "upwardly" and "down" or "downwardly" are used herein for clarity and ease of description only. They refer to directions as relate to the machine, setting on the ground, facing in the normal direction of travel while in operation.

Before beginning the detailed description, it should first be clearly understood that the type of balers, and its particular mode of operation is generally irrelevant to the application of the instant invention. The specific embodiment shown is a belt baler with a variable bale-forming chamber. The particulars of how this baler operates will not be discussed in detail, as in a general sense they are well known in the art.

Figure 1:
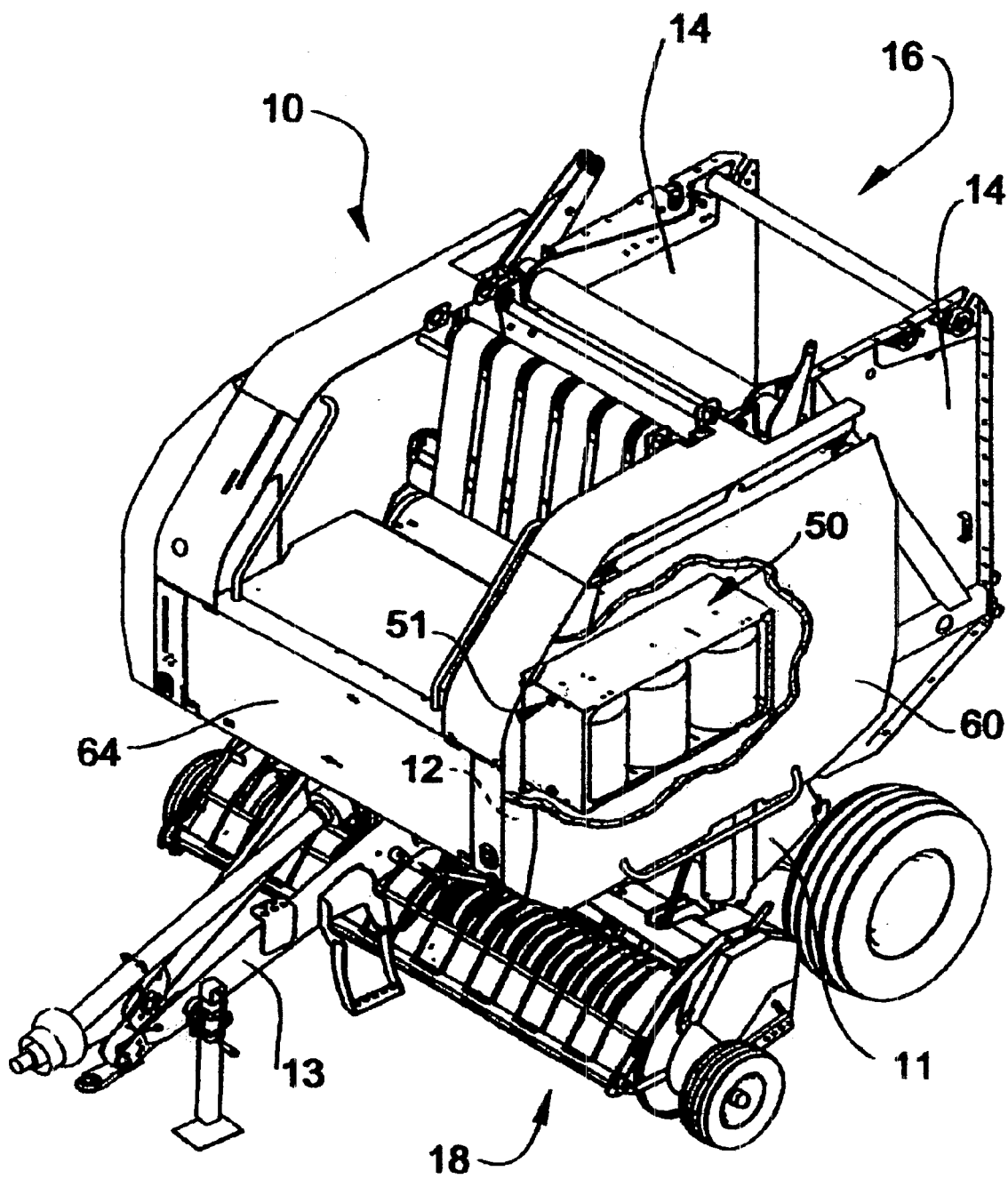
FIG. 1 is a left frontal elevated perspective view of a round baler showing the twine box of the instant invention behind a side panel of the baler (shown for clarity as transparent)

Referring now to FIG. 1 for a more detailed description of the preferred embodiment, a left frontal elevated perspective view of round baler 10 of the type in which the instant invention is readily embodied is shown. Baler 10 has an expandable bale-forming chamber defined in part by belts and rolls. This type of expandable chamber is disclosed in various prior art patents, e.g., U.S. Pat. No. 4,956,968, mentioned above, which is hereby incorporated in its entirety by reference. Since the instant invention is an improvement over the storage means shown in the '291 patent mentioned above, only the significant and necessary structure relating to the baler will be discussed in detail. Attention is directed to the '291 patent for more specific particulars relating to the baler itself.

Baler 10 has a main frame 11, comprising a plurality of rigid structural elements including a pair of sidewalls 12 (only one shown). Main frame 11 is supported by a pair of wheels 8 (also only one shown). A forwardly mounted tongue 13, integral with main frame 11, provides for connection to a tractor or other prime mover. Pivotally connected to sidewalls 12 by a pair of stub shafts is a tailgate 16 that is closed during bale formation. Tailgate 16 includes sidewalls coplanar with sidewalls 14. A pickup 18, mounted on main frame 11, has a plurality of tines, the tips of which are movable along a predetermined path to lift crop material from the ground and deliver it rearwardly along a generally horizontal path toward a floor roll, rotatably mounted on main frame 11.

Figure 2:
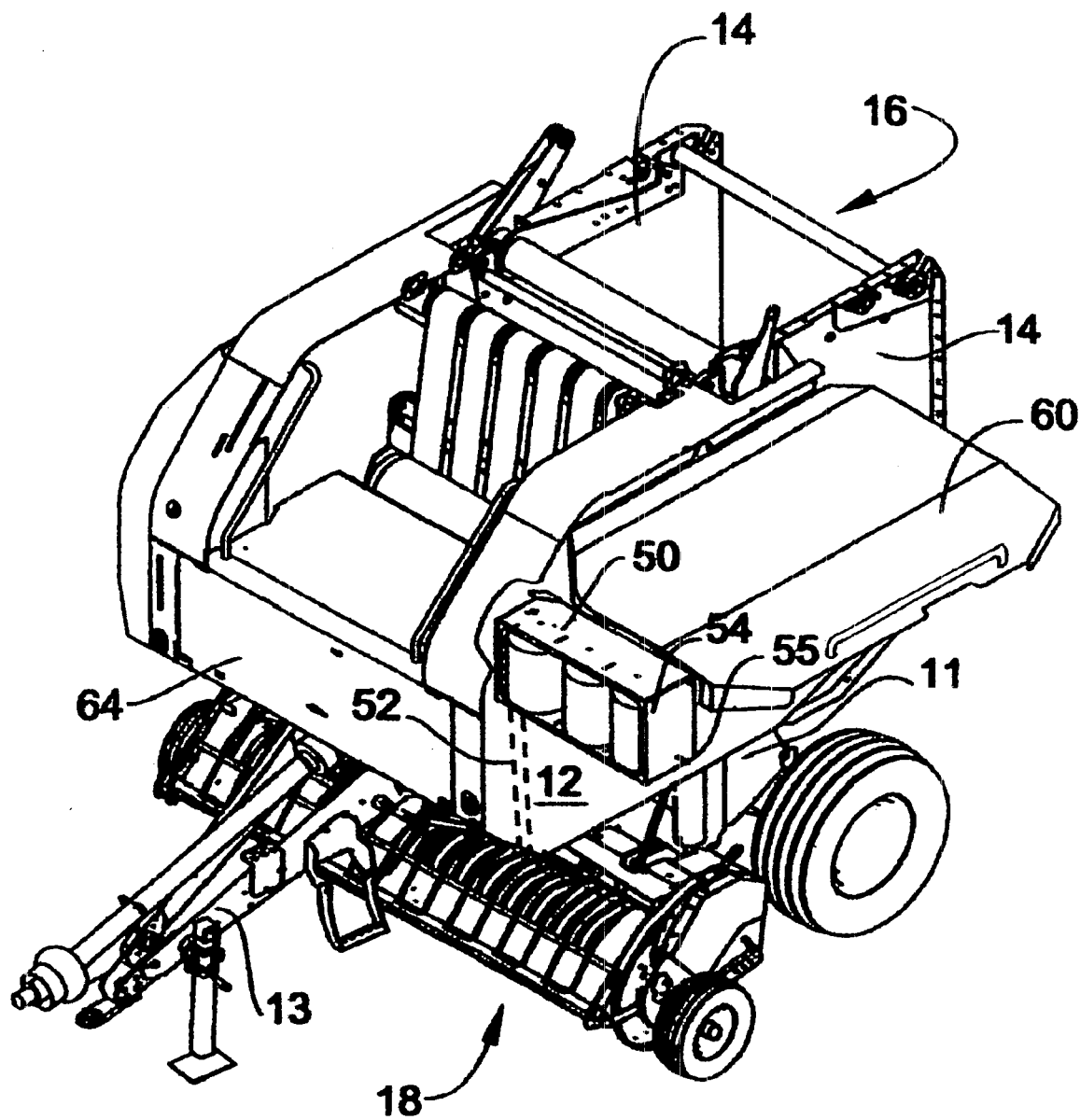
FIG. 2 is a left frontal elevated perspective view of a round baler, similar to FIG. 1, showing the twine box in the open, or pivoted, position and the side panel of baler in the raised position.
Figure 3:
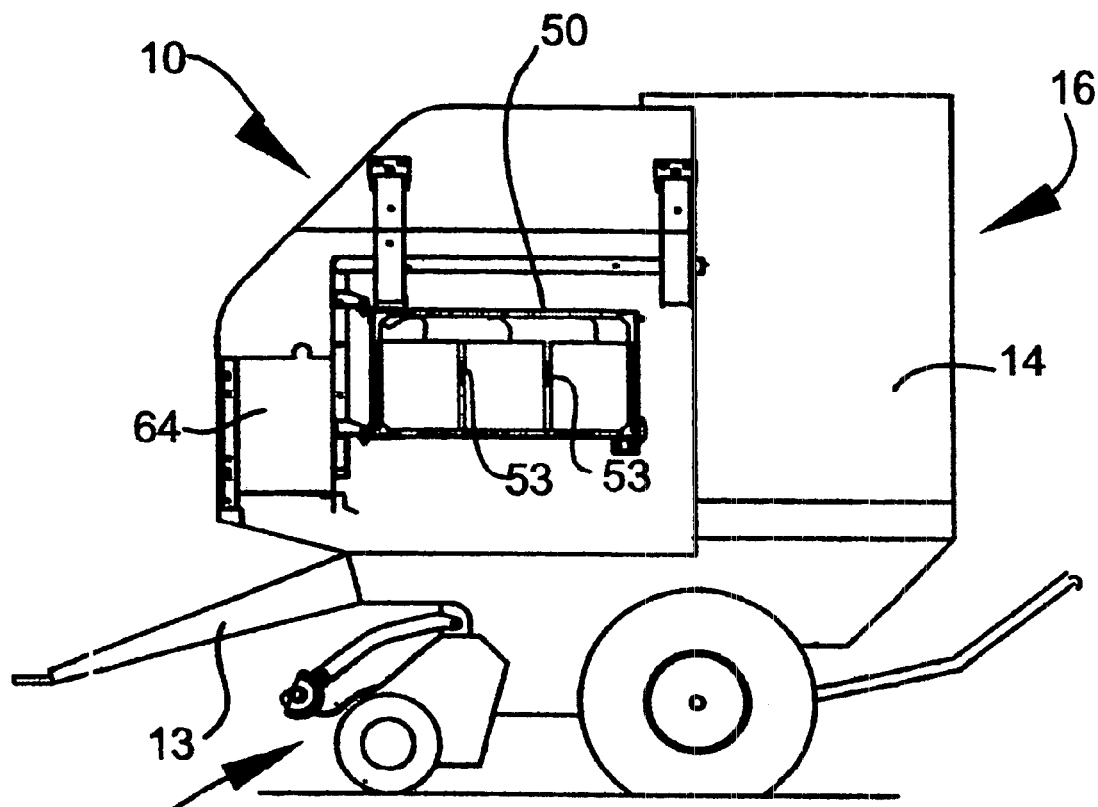
FIG. 3 is a simplified left side elevational view of a round baler with the main side panel removed to show the twine box of the instant invention in the closed position.

As best seen in FIGS. 1, 2 and 3, twine box 50 is positioned on the side of the bale-forming chamber and pivotably attached to vertical support member 52, shown in partial phantom in. FIG. 2. Support member 52 is, in turn, attached to main frame 11 and other structural members as appropriate. Behind twine box 50, when in the closed position, are many of the operational components (not shown) of the baler 10, such as, for example, journals and bearings, cables, etc. In the open, or pivoted position, these Operational components are readily accessible by a mechanic or operator for repair or adjustment. The twine feeds out of twine box 50 through the forward inside end thereof, or through an opening 51 adjacent the forward inside end thereof, and is fed to the twine dispensing mechanism. In this manner, excessive twine is not required, for fed out, in the process of pivoting the twine box to the open position, eliminating any requirement that the operator readjust the twine tension after this operation.

In the closed, or unpivoted, position, a pivotable side panel 60 can cover the twine box 50 and hold the twine in position. The twine balls could also be held in position with any other type of reasonable mechanism, such as, for example, a strap across the open portion thereof. Though panel 60 could be merely removable, it is shown as being pivoted vertically. Panel 60 could also pivot forwardly, rearwardly, or could include an additional smaller door to provide access to the twine box 50. Panel 60t would, of course, include some type of latching mechanism (not shown) to hold it in the open position and to lock it in the closed position.

Figure 4:
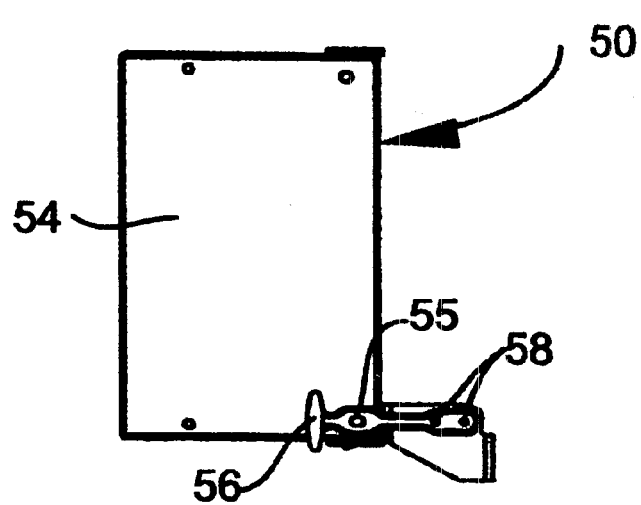
FIG. 4 is an end view of the twine box, taken along lines 4—4 of FIG. 3, showing the latch mechanism for holding the twine box in the closed position.

Twine box 50 comprises a rectangular open-sided box made up of sheet metal components. In this particular embodiment, there is room inside twine box 50 for three balls of twine; however, the maximum number of balls is limited practically only by the size of the baler itself. Separator plates, or dividers, 53, either fixed or removable, may be included in the twine box to separate the balls of twine. On the rearward, or outward end 54 of twine box 50 is located a protruding lock pin 55. As seen best in FIG. 4, a mating locking strap 56 is affixed to the sidewall of the baler, as at 58, to engage and hold lock pin 55. Conveniently, locking strap 56 can be made of rubber or other durable and flexible material to stretch slightly to mate with pin 55, thus holding twine box 50 in the closed, or unpivoted, position.

Figure 5:
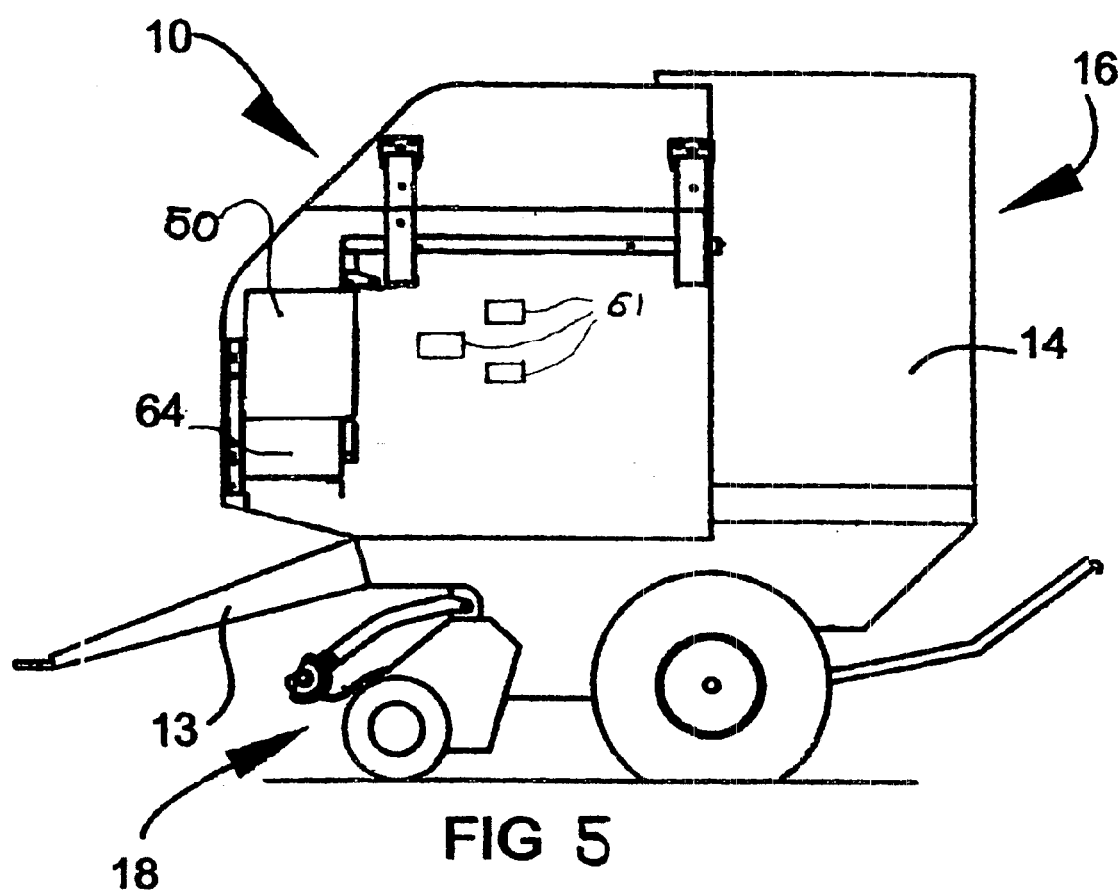
FIG. 5 is a simplified left side elevational view, similar to FIG. 3, showing the twine box 50 in the open position.

FIG. 5 shows a left side twine box 50 in the fully open position, exposing openings 61 through the left sidewall. Openings 61 provide access to various functional components of the crop-engaging mechanism.

While only one twine box is shown in the drawings, it is anticipated that for convenience sake, a similar twine box may be installed on the opposing side to operate in a similar manner, doubling the amount of twine available during field operation.

Across the front of the baler, and not shown in detail, is a roll-feeding mechanism 64. This roll-feeding mechanism is of known structure, such as that generally shown in the '291 patent. The mechanism may hold multiple rolls of roll material, such as net/plastic wrapping material.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A round baler for forming crop material into cylindrical bales, said baler comprising:
   a wheel-supported main frame including opposing longitudinal sidewalls;
   a bale-forming chamber having a generally cylindrical shape with a periphery and a transverse inlet and a crop-engaging mechanism disposed between and generally below said sidewalls;
   a crop feeding mechanism for feeding crop material into said chamber through said inlet whereupon said crop material is engaged by said crop-engaging mechanism under conditions where said crop engaging mechanism is moving along a portion of said periphery of said bale-forming chamber to engage said crop material and form it into a compacted cylindrical package as crop material accumulates in said chamber, said crop engaging mechanism including functional components affixed to and accessible through openings through said sidewalls; and
   a twine storage box pivotably affixed to one of said sidewalls between an open position and a closed position, said twine box comprising three vertical walls and two horizontal walls, forming an open-sided box into which said plurality of twine balls may be positioned; said twine box further including an outlet through which twine from said twine balls may be fed, said opening adjacent the pivot point of said twine box, said twine box covering at least some of said openings through said sidewalls and said functional components when in said closed position and providing ready access to said at least some functional components when in said open position.

2. The round baler of claim 1, wherein:
   said twine box including a locking mechanism for holding said twine box in said operable position, said locking mechanism including a protruding pin on said twine box and an elastomeric latch member affixed to said one of said sidewalls and engagable with said protruding pin.

3. The round baler of claim 2, further including:
   a side panel pivotally affixed to said one of said sidewalls, selectively pivotable between an open position exposing said twine box and said one of said sidewalls and a closed position substantially enclosing said twine box and said one of said sidewalls.

4. The round baler of claim 3, wherein:
   the other of said sidewalls, opposing said one of said sidewalls, includes a second open-sided twine box, into which a plurality of twine balls may be positioned, is pivotably affixed thereto for movement between an open position and a closed position;
   said second twine box is pivotally affixed to said other of said sidewalls and includes a locking mechanism for holding said second twine box in said closed position, said locking mechanism including a protruding pin on said second twine box and an elastomeric latch member affixed to said other of said sidewalls and engagable with said protruding pin; and
   a second side panel pivotally affixed to said other of said sidewalls, selectively pivotable between an open position exposing said second twine box and said other of said sidewalls and a closed position substantially enclosing said second twine box and said other of said sidewalls.

5. In a round baler for forming crop material into cylindrical bales, said baler having a wheel-supported main frame including opposing longitudinal sidewalls;
   a bale-forming chamber having a periphery and a generally cylindrical shape with a transverse inlet and a crop-engaging mechanism disposed between and below said sidewalls;
   a crop feeding mechanism for feeding crop material into said chamber through said inlet whereupon said crop material is engaged by said crop-engaging mechanism under conditions where said crop engaging mechanism is moving along a portion of said periphery of said bale-forming chamber to engage said crop material and form it into a compacted cylindrical package as crop material accumulates in said chamber, said crop engaging mechanism including functional components affixed to and accessible through openings through said sidewalls, the improvement comprising:
   a twine storage box pivotably affixed to one of said sidewalls between an open position and a closed position, said twine box comprising three vertical walls and two horizontal walls, forming an open-sided box into which said plurality of twine balls may be positioned; said twine box further including an outlet through which twine from said twine balls may be fed, said opening adjacent the pivot point of said twine box, said twine box covering at least some of said openings through said sidewalls and said functional components when in said closed position and providing ready access to said at least some functional components when in said open position.

6. The round baler of claim 5, wherein:
   said twine box including a locking mechanism for holding said twine box in said closed position, said looking mechanism including a protruding pin on said twine box and an elastomeric latch member affixed to said one of said sidewalls and engagable with said protruding pin.

7. The round baler of claim 6, further including:
   a side panel pivotally affixed to said one of said sidewalls, selectively pivotable between an open position exposing said twine box and said one of said sidewalls and a closed position substantially enclosing said twine box and said one of said sidewalls.

8. The round baler of claim 7, wherein:

the other of said sidewalls, opposing said one of said sidewalls, includes a second open-sided twine box, into which a plurality of twine balls may be positioned;

said second twine box pivotably affixed to said other of said sidewalls for movement between an open position and a closed position, and includes a locking mechanism for holding said second twine box in said closed position, said locking mechanism including a protruding pin on said second twine box and an elastomeric latch member affixed to said other of said sidewalls and engagable with said protruding pin; and a second side panel pivotally affixed to said other of said sidewalls, selectively pivotable between an open position exposing said second twine box and said other of said sidewalls and a closed position substantially enclosing said second twine box and said other of said sidewalls.

* * * * *